United States Patent
Kawai

(10) Patent No.: US 7,478,254 B2
(45) Date of Patent: Jan. 13, 2009

(54) SWITCHING POWER SUPPLY DEVICE WITH POWER ON FROM STANDBY SEQUENCE THAT INCLUDES RECONNECTING DUMMY RESISTOR TO LARGE LOAD POWER SUPPLY LINE

(75) Inventor: Yoshikazu Kawai, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 485 days.

(21) Appl. No.: 11/390,361

(22) Filed: Mar. 28, 2006

(65) Prior Publication Data
US 2006/0232221 A1 Oct. 19, 2006

(30) Foreign Application Priority Data
Mar. 30, 2005 (JP) .............................. 2005-100019

(51) Int. Cl.
G06F 1/26 (2006.01)
(52) U.S. Cl. .................. 713/323; 363/21.04; 363/21.07
(58) Field of Classification Search ............. 363/21.04, 363/21.07, 21.1; 713/320, 323
See application file for complete search history.

(56) References Cited

U.S. PATENT DOCUMENTS 5,920,466 A * 7/1999 Hirahara .................. 363/21.02
6,496,390 B2 * 12/2002 Yang ....................... 363/21.07

FOREIGN PATENT DOCUMENTS

JP 05-236743 A 9/1993
JP 09-065654 A 3/1997

* cited by examiner

Primary Examiner—Thomas Lee
Assistant Examiner—Albert Wang
(74) Attorney, Agent, or Firm—Crowell & Moring LLP

(57) ABSTRACT

A switching power supply device has a large load power supply line for a CRT circuit, to and from which a dummy resistor for voltage stabilization is connected and disconnected by a switch. In standby state, a control unit turns off the switch to disconnect the dummy resistor from the power supply line. When receiving a power supply ON command input by a user operating a remote control, the control unit turns on the switch to connect the dummy resistor to the power supply line. At a predetermined time after the dummy resistor connection, the control unit makes a regulator active to start providing voltage to a video/audio signal processing circuit with sufficient current providable thereto. This enables to reduce power consumption of the power supply line with the dummy resistor, and to prevent problems caused by insufficient current in transient state from standby state to power supply ON state.

4 Claims, 3 Drawing Sheets

SWITCHING POWER SUPPLY DEVICE WITH POWER ON FROM STANDBY SEQUENCE THAT INCLUDES RECONNECTING DUMMY RESISTOR TO LARGE LOAD POWER SUPPLY LINE

BACKGROUND OF THE INVENTION

1. Field of the Invention

The present invention relates to a switching power supply device, and more particular to a switching power supply device suitable as a power supply for an electronic video device, such as a multifunctional video device having a television (hereafter referred to as "TV") receiver with a video cassette recorder built therein (i.e. electronic video device having both TV receiver function and video cassette recorder function in one housing, which will be hereafter referred to as "TV with built-in VCR"), that is required to provide power supply both to a relatively large load, or large current, such as a CRT (Cathode Ray Tube) and a fluorescent tube for video output, and to a relatively small load such as an electronic control unit.

2. Description of the Related Art

Generally, a switching power supply device is used in an electronic device to obtain multiple voltages from one transformer for the electronic device. For example, a switching power supply device to be used as a power supply device for an electronic video device, such as a TV with built-in VCR or another electronic multifunctional video device e.g. having both TV receiver function and DVD (Digital Versatile Disc) player function in one housing, can easily generate various voltages for the electronic video device from a secondary DC power supply circuit of the switching power supply device. The various voltages include a voltage (typically 120V) for a CRT circuit including a flyback transformer, a voltage (typically 5V) for a control unit (control circuit) having a microcomputer mounted thereon, a voltage for a video/audio signal processing circuit, and a voltage for a loading motor for a video cassette or a video disc.

For example, a secondary DC power supply circuit of a switching power supply device has a 5V power supply line to which a control unit including a microcomputer is connected, and also has a 120V power supply line to which a CRT circuit including a flyback transformer is connected. Normally, the CRT circuit is a largest load, so that the 120V power supply line can be referred to as a large load power supply line, while the 5V power line can be referred to as a small load power supply line. The large load power supply line for the CRT circuit is connected to a voltage signal feedback line from the secondary DC power supply circuit to a primary DC power supply circuit of the switching power supply device.

On the other hand, for power saving, an electronic video device such as a TV receiver or a TV with built-in VCR is designed so that only a control unit including a microcomputer operates until a power supply ON command is input, i.e. in power supply standby state or mode, while the power supply is provided to e.g. a CRT circuit to start up the screen of the CRT only when the power supply ON command is input by a user operating a remote control. In a device of this kind, a dummy resistor is generally connected to an appropriate position in a secondary power supply circuit of the switching power supply device in order to reduce load fluctuation in or during the transition period from the power supply standby state to the power supply ON state, and to stabilize the voltages of secondary power supply lines. For the voltage stabilization, the dummy resistor is typically connected to the large load power supply line, as described above, in which the magnitude of the dummy resistor is normally set to be 10 to 30%, in some cases 50%, of a load imposed on the large load power supply line.

Due to the significant magnitude of the dummy resistor, the dummy resistor connected to the secondary power supply circuit, typically the large load power supply line, of the switching power supply device causes certain significant power consumption even in the power supply standby state. This is a waste of power, and is against the power saving. In order to solve this problem, one may consider using known technologies such as a technology disclosed in Japanese Laid-open Patent Publication Hei 9-65654 to disconnect or separate the dummy resistor in the power supply standby state from the circuit such as the large load power supply line, and to connect the dummy resistor to the large load power supply line only when the state of the circuit changes from the power supply standby state to the power supply ON state.

However, in the case of an electronic video device in which, as described above, a secondary DC power supply circuit of a switching power supply device provides a voltage to a large load such as a CRT circuit, and also provides a voltage to other relatively small loads such as a video/audio signal processing circuit, a problem initiated by the power supply ON operation of a user may occur as will be described below if the change from power supply standby state to power supply ON state (normal load state) and the connection of a dummy resistor are done at the same time. In this regard, it is to be noted that the switching power supply device is generally designed so that the voltages in the power supply standby state provided to the respective power supply lines, and hence the respective loads, are much lower than those in normal state (power supply ON state), and that the variation of the voltages of the power supply lines not connected to the voltage signal feedback line is coupled or analogous to the variation of the voltage of the power supply line connected to the voltage signal feedback line (for example, when the latter voltage is in a transient state, the former voltages are also in a transient state).

When a user inputs a power supply ON command signal, using a remote control, to initiate the change from the power supply standby state to the power supply ON state, a control unit having received the input power supply ON command signal connects the dummy resistor to the large load power supply line, and at the same time starts providing power supply to the electronic video device, more specifically to a video/audio signal processing circuit and a loading motor for a video cassette or a video disc (to start the operation of the electronic video device). This may cause a problem of insufficient current or current shortage in portions of the electronic video device such as the loading motor that require a relatively large current, causing bad operation of the electronic video device, because immediately after the dummy resistor is connected, the secondary DC power supply circuit is in a transient state and is provided with only a small current or insufficient current (current being particularly small in a small load power supply line to which a feedback line is not connected). More specifically, a problem may arise such that when a user inputs a command to remove a video cassette immediately after the user operates a power supply ON key of the remote control, the loading motor is not provided with a sufficient amount of rotation, failing to eject the video cassette.

Besides, in regards to disconnection or separation of a dummy resistor from a secondary circuit, Japanese Laid-open Patent Publication Hei 5-236743 discloses a technology to detect the magnitude of a secondary load, and disconnect a dummy resistor if the load exceeds a predetermined magnitude. However, this technology does not solve the above-described problem.

SUMMARY OF THE INVENTION

An object of the present invention is to provide such a switching power supply device suitable for an electronic video device that can reduce power consumption in power supply standby state even if a dummy resistor for voltage stabilization is provided in a secondary DC power supply circuit, and that can prevent various problems to be caused by insufficient current provided to the secondary DC power circuit in transient state from the power supply standby state to power supply ON state.

According to the present invention, this object is achieved by a switching power supply device comprising: a primary DC power supply circuit; a secondary DC power supply circuit; a transformer for connecting the primary and secondary DC power supply circuits; a power supply line to a large load and a power supply line to a small load (hereafter referred to respectively as "large load power supply line" and "small load power supply line"); a feedback line for feeding back a voltage signal from the large load power supply line to the primary DC power supply circuit; a dummy resistor for voltage stabilization connected at an end thereof to the large load power supply line; a switch connected to the other end of the dummy resistor for switching between connection and disconnection of the dummy resistor for operation to the large load power supply line; an on/off unit inserted in the small load power supply line; a control unit connected to the feedback line, the on-off unit and the switch; and a command signal receiving unit for receiving a power supply ON command signal from a user and sending the power supply ON command signal to the control unit. In the power supply standby state, the control unit (i) disconnects the feedback line from the primary DC power supply circuit, (ii) turns off the on/off unit to stop power supply to the small load power supply line, and further (iii) turns off the switch to disconnect the dummy resistor from the large load power supply line. When the command signal receiving unit receives a power supply ON command signal from the user in the power supply standby state, the control unit (i) connects the feedback line to the primary DC power supply circuit, (ii) turns on the on/off unit to allow the small load power supply line to start its operation, (iii) turns on the switch to connect the dummy resistor to the large load power supply line, and further (iv) turns on the on/off unit at a predetermined time after the dummy resistor is connected to the large load power supply line.

The switching power supply device according to the present invention makes it possible to reduce the power consumption in power supply standby state even if a dummy resistor for voltage stabilization is connected to a secondary DC power supply circuit. Further, it makes it possible to prevent various problems to be caused by insufficient current provided to the secondary DC power circuit in transient state from the power supply standby state to power supply ON state. For example, an electronic device which requires relatively large current, and which is connected to the switching power supply device of the present invention, can be prevented from failing to normally operate due to start of the operation of the electronic device while the current supply in the secondary DC power in the transient state is still insufficient.

Preferably, the on/off unit is a regulator which is switched by the control unit between active and inactive, or an on/off circuit which is turned on and off by the control unit.

Further preferably, the switching power supply device according to claim 1, which is used as a switching power supply device for an electronic video device, wherein the large load is a load of a CRT (Cathode Ray Tube) in the electronic video device, and the small load is a load of a video/audio signal processing circuit in the electronic video device. By using the switching power supply device for the electronic video device, the video/audio signal processing circuit in the electronic video device is prevented from starting its operation with insufficient current in the transient state, and is thereby prevented from failing to normally operate.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
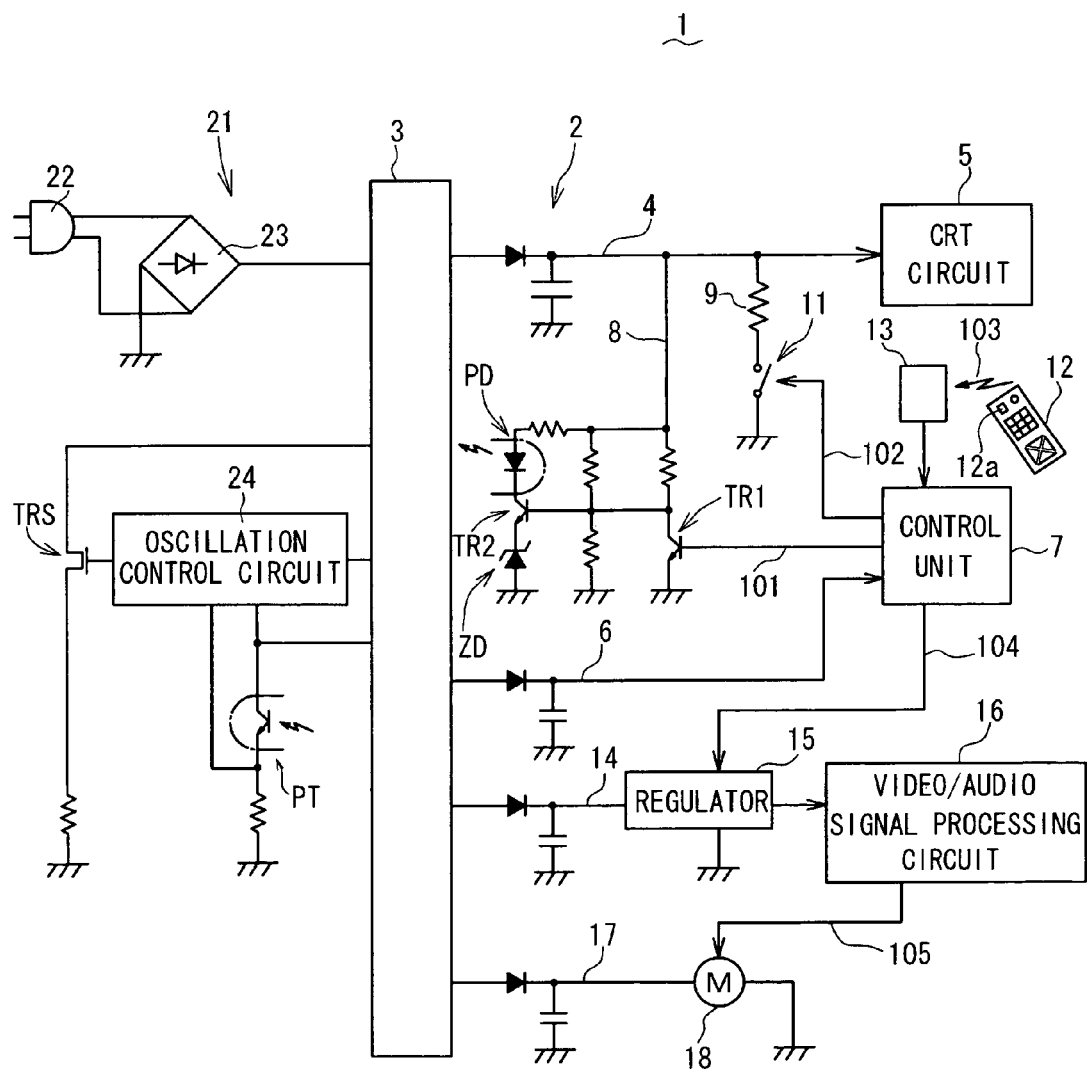
FIG. 1 is a schematic circuit diagram, partially in block form, of a switching power supply device according to an embodiment of the present invention and a part of a TV with built-in VCR to which the switching power supply device is connected.

The best modes and preferred embodiments of the present invention will be described hereinafter with reference to the annexed drawings. The specific embodiments described are not intended to cover the entire scope of the present invention, and hence the present invention is not limited to only the specific embodiments. Note that like parts are designated by like reference numerals or reference characters throughout the drawings. The following description exemplifies a case where the present invention is applied to a switching power supply device 1 mounted in a TV with built-in VCR, which has, in a single housing, portions that correspond to a TV receiver function and a video cassette recorder function.

FIG. 1 is a schematic circuit diagram, partially in block form, of a switching power supply device 1 according to an embodiment of the present invention and a part of a TV with built-in VCR to which the switching power supply device 1 is connected. The switching power supply device 1 is formed of a primary DC power supply circuit 21, a secondary DC power supply circuit 2 and a transformer 3 which connects the two DC power supply circuits 21 and 2. The primary DC power supply circuit 21 comprises: a rectifier circuit 23 connected to an AC power supply 22; an oscillation control circuit 24; a switching transistor TRS having a base connected to the oscillation control circuit 24; and a phototransistor PT coupled with a photodiode PD of the secondary DC power supply circuit 2, described below, to form a photocoupler.

The secondary DC power supply circuit 2 will be described. The secondary DC power supply circuit 2 comprises a 120V power supply line 4 (large load power supply line) connected to a CRT circuit 5 including a flyback transformer in the TV with built-in VCR as well as a 5V power supply line 6 connected to a control unit 7 (control circuit) formed of a microcomputer. If the TV with built-in VCR has a control unit, it may be possible to use such control unit as the control unit 7 in the switching power supply device 1 according to the present embodiment.

A feedback line 8 for providing a voltage signal to the primary DC power supply circuit 21 is connected to the 120V power supply line 4. A transistor TR2 is connected to the feedback line 8 and has an emitter connected to a zener diode ZD, in which the transistor TR2 and the zener diode ZD form a feedback amplifier circuit. The transistor TR2 has a collector connected to a photodiode PD forming a couple with the phototransistor PT of the primary DC power supply circuit 21, and has a base connected to a transistor TR1 having a base connected to the control unit 7 by a feedback line 101 to provide a high signal or a low signal, as a feedback line control signal, to the transistor TR1.

When the voltage of the feedback line 8 increases while the control unit 7 provides a high signal as a feedback line control signal to the transistor TR1 through the feedback line 101 to make the transistor TR1 conductive, the photodiode PD emits light according to the increased voltage of the feedback line 8. This reduces on-duty time of the switching transistor TRS, thereby reducing the output voltage of the secondary DC power supply circuit 2. On the other hand, when the control unit 7 provides a low signal as a feedback line control signal to the transistor TR1 through the feedback line 101 to make the transistor TR1 non-conductive, it makes the transistor TR2 non-conductive, thereby stopping a voltage signal to be output to the primary DC power supply circuit 21.

The switching power supply device 1 further comprises a dummy resistor 9 for voltage stabilization having a magnitude or value according to the load of the CRT circuit 5 and being connected at an end thereof to the 120V power supply line 4. Connected between the other end of the dummy resistor 9 and ground is a switch 11 which is turned on and off in response to a control signal (dummy resistor control signal) provided by the control unit 7 through a control signal line 102. In other words, the switch 11 connected between the other end of the dummy resistor 9 and ground switches between connection and disconnection of the dummy resistor 9 for operation to and from the 120V power supply line 4.

A light signal receiving unit 13 for receiving light signals from a remote control 12 is connected to the control unit 7. When the control unit 7 receives a signal sent from the remote control 12 via the light signal receiving unit 13, such as a channel change command signal or a power supply ON command signal 103, which is to be sent when a user operates a power supply ON key 12a of the remote control 12, the control unit 7 sends a control signal according to content of each command to appropriate elements and units in the TV with built-in VCR.

The secondary DC power supply circuit 2 further comprises a power supply line 14 (small load power supply line) and a regulator 15 connected to the small load power supply line 14. The regulator 15 is connected to a video/audio signal processing circuit 16 of the TV with built-in VCR so as to stabilize and provide the voltage of the small load power supply line 14 to the video/audio signal processing circuit 16. The control unit 7 is further connected to the regulator 15 by a control signal line 104 to provide a control signal (regulator control signal) to the regulator 15 so as to switch the state of the regulator between active and inactive. In other words, the regulator 15 under the control of the control unit 7 is a multifunctional unit to serve both as a voltage stabilizer to stabilize the voltage of the small load power supply line 14 to the video/audio signal processing circuit 16 and as an on/off unit to control on/off state of the small load power supply line 14 to the video/audio signal processing circuit 16, namely to switch between connection and disconnection of the small load power supply line 14 to and from the video/audio signal processing circuit 16.

Only after the state of the regulator 15 is switched from inactive to active, the video/audio signal processing circuit 16 starts receiving voltage and starts its operation. Then, when a TV receiving function is selected by a user, the video/audio signal processing circuit 16 subjects video/audio signals received by the TV with built-in VCR to predetermined signal processing such as modulation and amplification, and outputs the processed signals to the CRT circuit 5. On the other hand, when a video cassette recorder function is selected by the user, the video/audio signal processing circuit 16 outputs e.g. a motor control signal through a control signal line 105 to a loading motor 18, which is connected to a still further power supply line 17 of the secondary power supply circuit 2 for receiving voltage, so as to rotate the loading motor 18, and thereby, for example, to eject a video tape cassette.

Note here that the switching power supply device 1 is designed, like a general switching power supply device, such that the voltages in power supply standby state or mode provided to the respective power supply lines 4, 14 and 17, and hence the respective loads connected thereto, are much lower than those in normal mode (power supply ON state), and that the variation of the voltages of the power supply lines 14 and 17, being not connected to the voltage signal feedback line, is coupled or analogous to the variation of the voltage of the power supply line 4 connected to the voltage signal feedback line (for example, when the latter voltage is in a transient state, the former voltages are also in a transient state).

Figure 2:
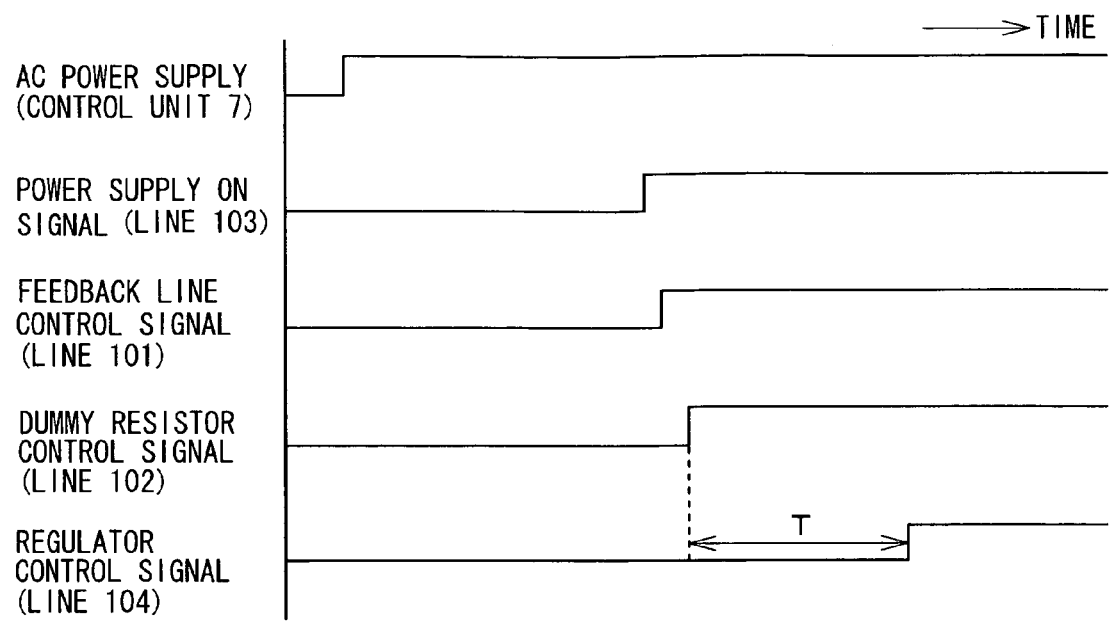
FIG. 2 is a timing chart showing timings of various control signals in the switching power supply device.

Referring now to the timing chart of FIG. 2, which shows timings of various control signals in the switching power supply device 1, a process of change of states of the switching power supply device 1 (namely states of the TV with built-in VCR), such as power supply standby state, power supply ON state and active state of the regulator 15, will be described. When the switching power supply device 1 mounted in the TV with built-in VCR is connected to the AC power supply 22, the control unit 7 is immediately provided with voltage from the 5V power supply line 6, and starts its operation to bring the switching power supply device 1 to power supply standby state. Note that the term "power supply standby state" or "power supply standby mode" used herein can mean that either the switching power supply device 1 or an electronic device (which is the TV with built-in VCR) to be connected to, and provided with power supply from, the switching power supply device 1 is in a state of standby before being provided with power supply and starting its operation.

In this power supply standby state or mode, the control unit 7 sends a low signal as a feedback line control signal to the transistor TR1 through the feedback line 101 to make the transistor TR1 non-conductive so as to stop a voltage signal to be fed back to the primary DC power supply circuit 21. The control unit 7 further sends a low signal as a regulator control signal to the regulator 15 through the control signal line 104 so as to make the regulator 15 inactive. Furthermore, the control unit 7 sends a low signal as a dummy resistor control signal to the switch 11 through the control signal line 102 so as to turn off the switch 11, and thereby to disconnect or separate the dummy resistor 9 from the large load power supply line 4.

Thereafter, when a user operates the power supply ON key 12a of the remote control 12, a power supply ON command signal 103 is input to the control unit 7 via the light signal receiving unit 13. When the control unit 7 recognizes the power supply ON command signal 103, the control unit 7 sends control signals in the following order as shown in FIG. 2. First, the control unit 7 sends a high signal as a feedback line control signal through the feedback line 101 to the transistor TR1 so as to make the transistor TR1 conductive, thereby starting feedback of a voltage signal to the primary DC power supply circuit 21. Subsequently, the control unit 7 sends a high signal as a dummy resistor control signal through the control signal line 102 so as to turn on the switch 11, thereby connecting the dummy resistor 9 to the large load power supply line 4.

At a predetermined time T after the dummy resistor 9 is connected to the large load power supply line 4, the control unit 7 sends a high signal as a regulator control signal through the control signal line 104 to the regulator 15 so as to make the regulator 15 active, and thereby to provide voltage to the video/audio signal processing circuit 16, starting the video/audio signal processing circuit 16. Here, the time T is to be adjusted to increase or decrease according to the magnitude of the dummy resistor 9.

The function of the combination of the dummy resistor 9 and the regulator 15 as provided in the switching power supply device 1 will be described. When the switch 11 is turned on, the dummy resistor 9, as an additional load, is connected for operation to the large load power supply line 4. Thus, a voltage signal from the large load power supply line 4 is fed back to the primary power supply circuit 21 under the sum load including the load of the CRT circuit 5 and the dummy resistor 9 for voltage stabilization. According to the circuit configuration of the switching power supply device 1 having the dummy resistor 9 as added above, the voltage of the large load power supply line 4 initially varies, particularly due to the dummy resistor 9, and is gradually stabilized to a steady voltage corresponding to the dummy resistor 9, after the switch 11 is turned on.

Similarly, after the switch 11 is turned on, the voltages of other power supply lines 14 and 17 also initially vary and are gradually stabilized to steady voltages, respectively, because the variation of the voltages of the power supply lines 14 and 17 is coupled or analogous to the variation of the voltage of the large load power supply line 4. In or during an initial time period (transient state) immediately after the switch 11 is turned on, however, the voltages of the power supply lines 14 and 17 are not high enough. This is more so in the power supply lines 14 and 17 than in the power supply line 4, because the voltage of the power supplies 14 and 17 is for comparatively smaller loads and is thus lower than the voltage of the power supply 4 in the power supply standby state. This causes significantly insufficient current or current shortage in these power supply lines 14 and 17. However, such low voltages (insufficient current) of the power supply lines 14 and 17 in or during the initial time period do not cause a problem because the regulator 15 as described above is provided in the switching power supply device 1.

More specifically, in the case of the small load power supply line 14 of the secondary DC power supply circuit 2, the regulator 15 therein is made active only at a predetermined time T after the switching 11 is turned on (i.e. after the dummy resistor 9 is connected to the large load power supply line 4). Accordingly, the power supply line 14 can start providing voltage to the video/audio signal processing circuit 16 after the voltage of the power supply line 14 becomes sufficiently high to allow a sufficiently large current to flow to the video/audio signal processing circuit 16, if the time T is appropriately selected. This makes it possible to prevent the video/audio signal processing circuit 16 from having the problem due to the insufficient current.

In the case of the power supply line 17 according to the present embodiment, the loading motor 18 connected therein is designed to start its operation after receiving a motor control signal from the video/audio signal processing circuit 16 through the control signal line 105. This means that the loading motor 18 receives the motor control signal from the video/audio signal processing circuit 16, so as to start its operation, at a significant time after the dummy resistor 9 is connected to the large load power supply line 4 (at least after the video/audio signal processing circuit 16 starts its operation).

Accordingly, the power supply line 17 can start providing voltage to the loading motor 18 after the voltage of the power supply line 17 becomes sufficiently high to allow a sufficiently large current to flow to the loading motor 18, if the time T is appropriately selected. This makes it possible to prevent the loading motor 18 from not being provided with a sufficient amount of rotation and thereby from failing to eject a video cassette. Conversely, the predetermined time T according to the present embodiment is such time that is to be selected to be of a sufficient time length to allow the voltages of the power supply lines 14 and 17 to become sufficiently high, but that is to be as short as possible to enable as quick a start of the switching power supply device 1 (i.e. start of the electronic video device connected to the switching power supply device 1) as possible under the premise of the sufficient time length.

Figure 3:
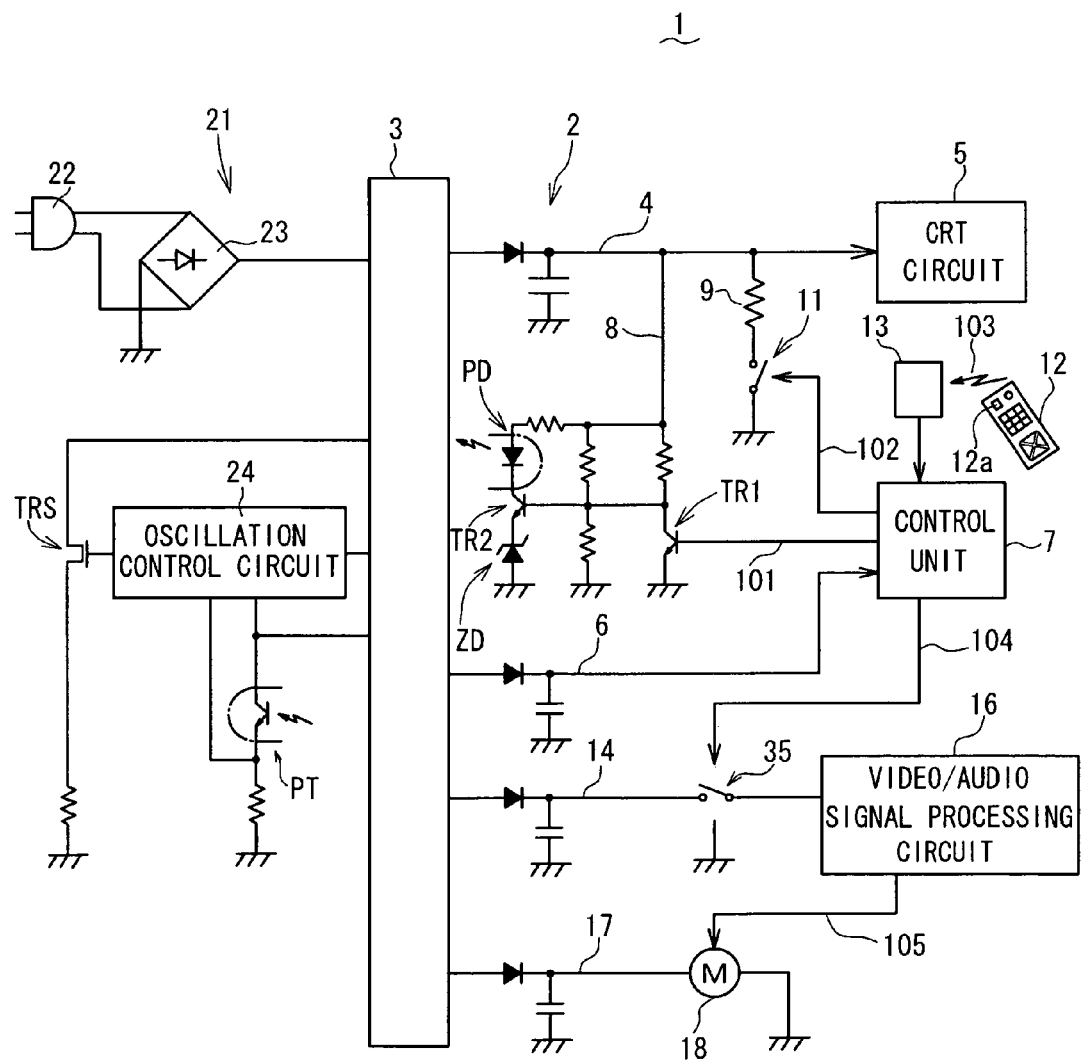
FIG. 3 is a schematic circuit diagram, partially in block form, of a modification of the switching power supply device and a part of a TV with built-in VCR to which the switching power supply device is connected.

As shown in FIG. 3, when the video/audio signal processing circuit 16 per se has a built-in voltage stabilization circuit, the regulator 15 can be replaced by an on/off circuit 35 which switches between connection and disconnection of the small load power supply line 14 to and from the video/audio signal processing circuit 16. The on/off circuit 35 under the control of the control unit 7 here to substitute for the regulator 15 is a monofunctional unit to serve as an on/off unit to control on/off state of the small load power supply line 14 to the video/audio signal processing circuit 16, namely to switch between connection and disconnection of the small load power supply line 14 to and from the video/audio signal processing circuit 16. In this case, the control unit 7 sends a control signal to, and thereby controls, the on/off circuit 35 via the control signal line 104, and switches the off-state of the on/off circuit 35 in power supply standby state to the on-state of the on/off circuit 35 at a predetermined time T after the dummy resistor 9 is connected for operation to the large load power supply line 4.

It is to be noted that the present invention is not limited to the above embodiments, and various modifications are possible. For example, if the switching power supply device of the present invention is to be used for an electronic video device other than the TV with built-in VCR, circuits of the electronic video device to be connected to the secondary DC power supply circuit 2 are to be variously modified accordingly. For example, if the electronic video device has a liquid crystal panel as a video output means and a DVD player as a video/audio reproduction means, the large load power supply line 4 is to be connected to e.g. a fluorescent tube of the liquid crystal panel, while the small load power supply line 14 is to be connected to e.g. a loading motor and a spindle motor for disc rotation in the DVD player.

In any event, when the switching power supply device 1 is used for an electronic device, such as an electronic video device as described above, the dummy resistor 9 is disconnected or separated from the large load power supply line 4 in power supply standby state. Thus, the power consumption in the power supply standby state can be reduced, achieving power saving. In addition, the control unit 7 controls to provide power supply to e.g. the small load power supply line 14 at a predetermined time T after controlling to connect the dummy resistor 9 to the large load power supply line 4. This makes it possible to prevent a circuit or a portion of the electronic device connected to the small load power supply line 14 from failing to normally operate due to insufficient current to be provided thereto.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2005-100019 filed Mar. 30, 2005, the contents of which are hereby incorporated by reference.

What is claimed is:

1. A switching power supply device comprising:
   a primary DC power supply circuit;
   a secondary DC power supply circuit;
   a transformer for connecting the primary and secondary DC power supply circuits;
   a large load power supply line to a large load and a small load power supply line to a small load;
   a feedback line for feeding back a voltage signal from the large load power supply line to the primary DC power supply circuit;
   a dummy resistor for voltage stabilization connected at an end thereof to the large load power supply line;
   a switch connected to the other end of the dummy resistor for switching between connection and disconnection of the dummy resistor for operation to the large load power supply line;
   an on/off unit inserted in the small load power supply line;
   a control unit connected to the feedback line, the on-off unit and the switch; and
   a command signal receiving unit for receiving a power supply ON command signal from a user and sending the power supply ON command signal to the control unit,
   wherein in the power supply standby state, the control unit (i) disconnects the feedback line from the primary DC power supply circuit, (ii) turns off the on/off unit to stop power supply to the small load power supply line, and further (iii) turns off the switch to disconnect the dummy resistor from the large load power supply line, and
   wherein when the command signal receiving unit receives a power supply ON command signal from the user in the power supply standby state, the control unit (i) connects the feedback line to the primary DC power supply circuit, (ii) turns on the on/off unit to allow the small load power supply line to start its operation, (iii) turns on the switch to connect the dummy resistor to the large load power supply line, and further (iv) turns on the on/off unit at a predetermined time after the dummy resistor is connected to the large load power supply line.

2. The switching power supply device according to claim 1, wherein the on/off unit is a regulator which is switched by the control unit between active and inactive.

3. The switching power supply device according to claim 1, wherein the on/off unit is an on/off circuit which is turned on and off by the control unit.

4. The switching power supply device according to claim 1, which is used as a switching power supply device for an electronic video device, wherein the large load is a load of a CRT (Cathode Ray Tube) in the electronic video device, and the small load is a load of a video/audio signal processing circuit in the electronic video device.

* * * * *